United States Patent
Smith et al.

(10) Patent No.: US 8,899,389 B2
(45) Date of Patent: Dec. 2, 2014

(54) THERMALLY-CONDUCTIVE VIBRATION ISOLATORS AND SPACECRAFT ISOLATION SYSTEMS EMPLOYING THE SAME

(75) Inventors: Dennis Wayne Smith, Phoenix, AZ (US); Steven Hadden, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 748 days.

(21) Appl. No.: 13/111,842

(22) Filed: May 19, 2011

(65) Prior Publication Data
US 2012/0292476 A1    Nov. 22, 2012

(51) Int. Cl.
| | | |
|---|---|---|
| *F16F 9/52* | (2006.01) | |
| *F16F 9/08* | (2006.01) | |
| *F16M 1/00* | (2006.01) | |
| *B64G 1/64* | (2006.01) | |
| *F16F 9/20* | (2006.01) | |
| *F16F 15/02* | (2006.01) | |
| *B64G 1/28* | (2006.01) | |

(52) U.S. Cl.
CPC . *B64G 1/641* (2013.01); *F16F 9/20* (2013.01); *F16F 15/022* (2013.01); *B64G 1/283* (2013.01); *B64G 1/285* (2013.01); *B64G 1/286* (2013.01)
USPC .......................... 188/276; 188/298; 248/638

(58) Field of Classification Search
USPC ............. 188/266, 266.2, 268, 378–380, 276, 188/298; 267/136, 140.13; 248/554, 248/561–563, 568, 565, 580, 602, 638
See application file for complete search history.

(56) References Cited

U.S. PATENT DOCUMENTS

| | | | | |
|---|---|---|---|---|
| 3,604,504 A | | 9/1971 | Kessler, Jr. et al. | |
| 4,402,358 A | * | 9/1983 | Wolf | 165/276 |
| 4,760,996 A | * | 8/1988 | Davis | 267/122 |
| 4,789,023 A | | 12/1988 | Grant | |
| 4,951,740 A | * | 8/1990 | Peterson et al. | 165/276 |
| 5,183,137 A | | 2/1993 | Siwek et al. | |
| 5,249,783 A | | 10/1993 | Davis | |
| 5,257,680 A | | 11/1993 | Corcoran et al. | |
| 5,305,981 A | * | 4/1994 | Cunningham et al. | 248/550 |
| 5,332,070 A | | 7/1994 | Davis et al. | |

(Continued)

FOREIGN PATENT DOCUMENTS

| | | |
|---|---|---|
| DE | 102009034295 A1 | 2/2011 |
| EP | 623764 | * 11/1994 |

OTHER PUBLICATIONS

European Patent Office, European Office Action for Application No. 12 166 249.8 dated Sep. 7, 2012.
EP Search Report for 12 166 249.8 dated Aug. 17, 2012.

*Primary Examiner* — Vishal Sahni
(74) *Attorney, Agent, or Firm* — Ingrassia Fisher & Lorenz, P.C.

(57) ABSTRACT

Embodiments of a thermally-conductive vibration isolator are provided, as are embodiments of a spacecraft isolation employing a plurality of thermally-conductive vibration isolators. In one embodiment, the thermally-conductive vibration isolator includes a first end portion, a second end portion substantially opposite the first end portion, and first and second load transfer paths from the first end portion to the second end portion. The first and second load transfer paths comprise a main spring and a damper in parallel with the main spring, respectively. An elongated thermal conduit, which has a thermal conductivity exceeding that of first load transfer path and the second load transfer path, extends from the first end portion to the second end portion.

18 Claims, 3 Drawing Sheets

(56) References Cited

U.S. PATENT DOCUMENTS

| | | |
|---|---|---|
| 6,715,591 B2 * | 4/2004 | Davis .......................... 188/268 |
| 7,100,389 B1 | 9/2006 | Wayburn et al. |
| 7,647,961 B2 | 1/2010 | Thayer et al. |
| 8,327,985 B2 * | 12/2012 | Boyd et al. .................... 188/379 |
| 2006/0180417 A1 * | 8/2006 | Ruebsamen et al. .......... 188/297 |
| 2006/0243549 A1 * | 11/2006 | Young .......................... 188/267 |
| 2010/0320358 A1 * | 12/2010 | Boyd et al. .................... 248/636 |

* cited by examiner

THERMALLY-CONDUCTIVE VIBRATION ISOLATORS AND SPACECRAFT ISOLATION SYSTEMS EMPLOYING THE SAME

TECHNICAL FIELD

The present invention relates generally to spacecraft isolation systems and, more particularly, to embodiments of a thermally-conductive vibration isolator, as well as to embodiments of a spacecraft isolation system employing a plurality of thermally-conductive vibration isolators.

BACKGROUND

Control moment gyroscope arrays, reaction wheel arrays, and other such deployed onboard spacecraft for attitude adjustment purposes generate vibratory forces during operation. Vibration isolation systems may be deployed between such attitude adjustment payloads and the spacecraft body to minimize the transmission of vibratory forces to the spacecraft body and any vibration-sensitive components (e.g., optical payloads) carried thereby. A typical vibration isolation system includes a number of individual vibrations isolators (typically three to eight isolators), which are positioned between the spacecraft payload and the spacecraft body in a multi-point mounting arrangement. The performance of a vibration isolation system is largely determined by the number of isolators included within the system, the manner in which the isolators are arranged, and the vibration attenuation characteristics of each individual isolator. In the case of passive damping systems, vibration isolation system employing three parameter isolators, which behave mechanically as a primary spring in parallel with a series-coupled secondary spring and damper, typically provide superior attenuation of high frequency vibratory forces (commonly referred to as "jitter") as compared to vibration isolation systems employing other types of isolators (e.g., viscoelastic isolators).

In addition to producing vibrations, attitude adjustment payloads also tend to produce excessive amounts of heat during operation due, at least in part, to frictional forces at rotary interfaces and thermal inefficiencies inherent in electronics. If not adequately dissipated, the excess heat generated by a spacecraft payload can decrease the lifespan of hardware, increase the ambient temperature range to undesirable levels, and, in severe cases, result in equipment failure. A limited amount of excess heat may be removed from a payload by radiation; however, radiative heat transfer is generally inadequate to provide sufficient dissipation of heat in the case of payloads, such as larger control moment gyroscope arrays and reaction wheels arrays, having a relatively large thermal output. While radiative heat transfer can be improved by increasing the cumulative surface area of spacecraft-mounted parts in view of the heated payload surfaces (referred to as the "radiative view factor"), such a practice adds undesirable weight and bulk to the spacecraft and may still fail to provide adequate heat dissipation.

Heat straps may be utilized in conjunction with a vibration isolation system to provide supplemental, efficient heat transfer paths from the spacecraft payload to the spacecraft body. Heat straps commonly assume the form of highly-conductive, flexible metal strips or wire braids connected between the spacecraft payload and the spacecraft body. In general, the thermal conductivity of a heat strap is proportional to heat strap's cross-sectional area. Thus, as a spacecraft payload requires the removal of larger quantities of heat, the cross-sectional dimensions of the heat straps can be enlarged to provide the desired thermal capacity. However, as the dimensions of a heat strap increase, so too do the weight and stiffness of the heat strap. While providing excellent thermal conduction paths for payload heat dissipation, heat straps having larger cross-sectional areas tend to be undesirably bulky and weighty for deployed onboard a spacecraft. More importantly, heat straps having larger cross-sectional areas tend to be relatively stiff and may shunt vibratory forces around the vibrational isolators directly to the spacecraft body thereby partially defeating the effectiveness of the vibrational isolation system.

It would thus be desirable to provide embodiments of a relatively lightweight, compact, and low cost vibration isolator that provides effective attenuation of vibrations, while also providing an efficient thermal path for dissipating heat from a spacecraft payload to a host spacecraft. It would also be desirable to provide embodiments of a spacecraft isolation system employing a plurality of thermally-conductive vibration isolators. Other desirable features and characteristics of embodiments of the present invention will become apparent from the subsequent Detailed Description and the appended Claims, taken in conjunction with the accompanying drawings and the foregoing Background.

BRIEF SUMMARY

Embodiments of a thermally-conductive vibration isolator are provided. In one embodiment, the thermally-conductive vibration isolator includes a first end portion, a second end portion substantially opposite the first end portion, and first and second load transfer paths from the first end portion to the second end portion. The first and second load transfer paths comprise a main spring and a damper in parallel with the main spring, respectively. An elongated thermal conduit, which has a thermal conductivity exceeding that of first load transfer path and the second load transfer path, extends from the first end portion to the second end portion.

Embodiments of a spacecraft isolation system for minimizing the transmission of vibrations between a spacecraft and a payload are further provided. In one embodiment, the spacecraft isolation system includes a plurality of thermally-conductive vibration isolators and mounting hardware coupled to plurality of thermally-conductive vibration isolators. Each of the thermally-conductive vibration isolators includes a first end portion, a second end portion substantially opposite the first end portion, and first and second load transfer paths from the first end portion to the second end portion. The first load transfer path includes a main spring. The second load transfer path includes a secondary spring in parallel with the main spring, as well as a damper in parallel with the main spring and in series with the secondary spring. Each of the thermally-conductive vibration isolators further includes an elongated heat pipe, which, in turn, includes an elongated body and at least one bellows section coupled to the elongated body. The elongated body of the heat pipe extends from the first end portion to the second end portion through each of the main spring, the secondary spring, and the damper. The at least one bellows section imparts the elongated heat pipe with an axial stiffness less than the axial stiffness of the main spring and less than the cumulative axial stiffness of the secondary spring and the damper.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
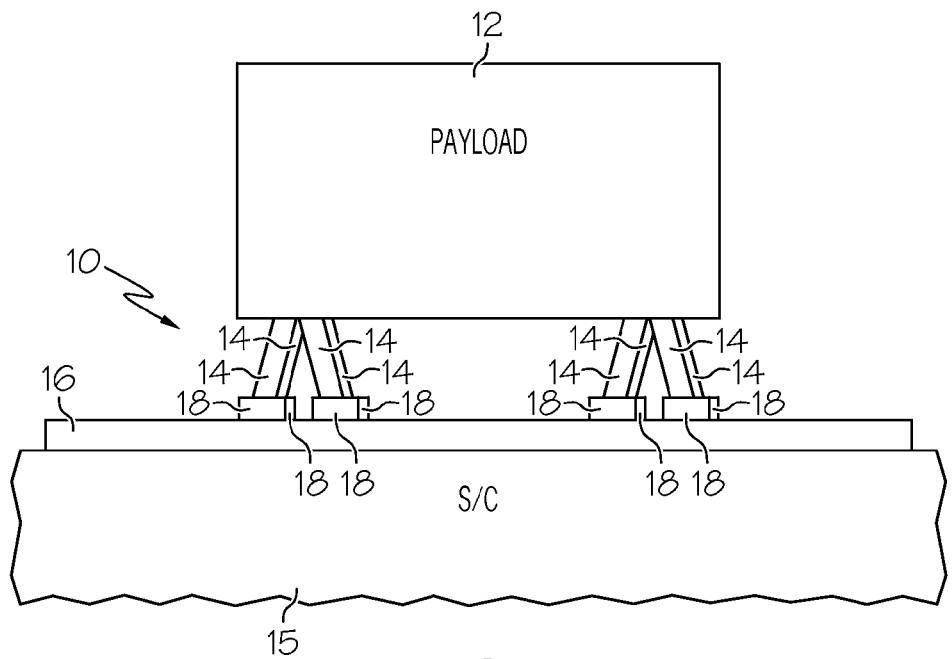
FIGS. 1 and 2 is simplified schematic and isometric views, respectively, of an isolation system employing eight vibration isolators to provide high fidelity isolation in six degrees of freedom in accordance with an exemplary embodiment of the present invention.

FIG. 1 is simplified schematic of a vibration isolation system 10 illustrated in accordance with an exemplary embodiment of the present invention and well-suited for reducing the transmission of vibrations between a payload 12 and a host spacecraft 15. In the illustrated example, isolation system 10 includes a plurality of single degree of freedom or axially-damping vibration isolators 14, which are mechanically coupled to and collectively support payload 12. The opposing ends of isolators 14 are mounted to a spacecraft mounting interface 16 utilizing a plurality of mounting brackets 18. In this particular example, isolation system 10 includes eight vibration isolators 14, which are positioned in an octopod mounting arrangement to provide high fidelity damping in six degrees of freedom. However, in further embodiments, isolation system 10 may include a lesser number or a greater number of isolators, which may be positioned in other mounting arrangements. For example, in an alternative embodiment, isolation system 10 may include six vibration isolators 14 positioned in a hexapod or Stewart platform-type mounting arrangement.

Figure 2:
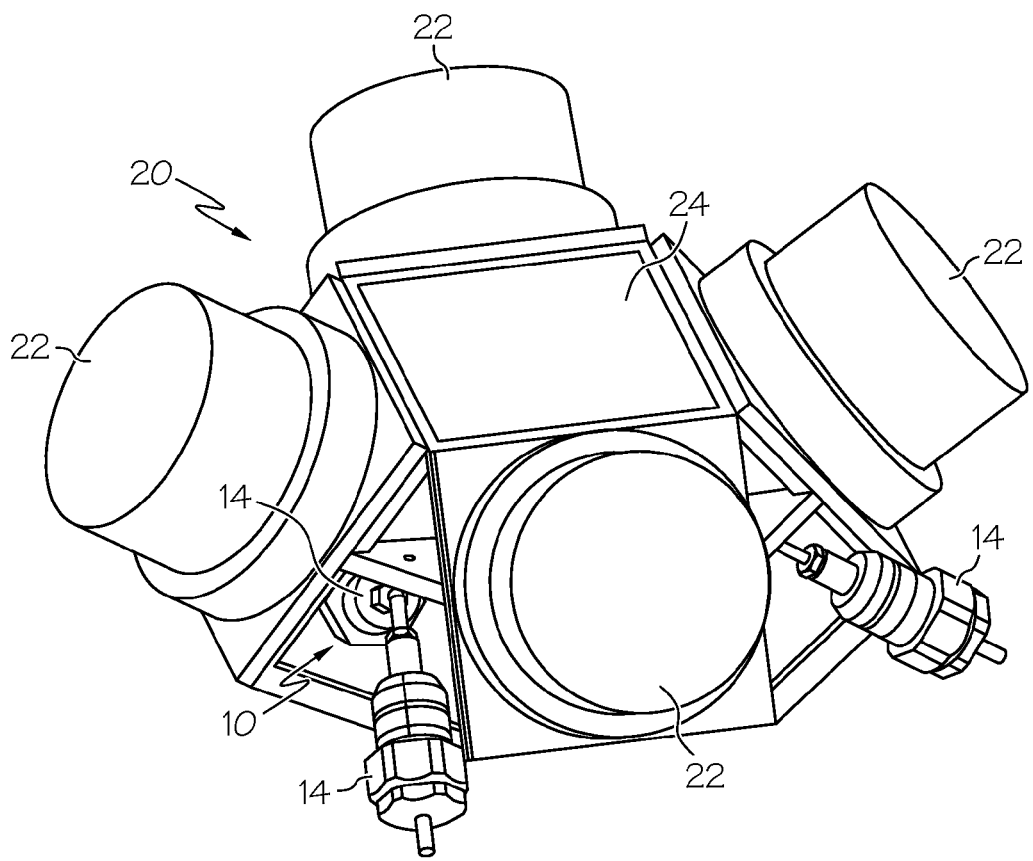

In certain embodiments, payload 12 may assume the form of a vibration-sensitive component, such as an optical payload or sensor suite, and isolation system 10 may serve to minimize the transmission of vibrations from a vibration-emitting source aboard spacecraft 15, through spacecraft mounting interface 16, and to payload 12. In other embodiments, payload 12 may include one or more vibration-emitting devices, and isolation system 10 may serve to reduce the transmission of vibrations from payload 12 to spacecraft 15 and any vibration-sensitive components deployed thereon. In this latter regard, payload 12 may include one or more rotational devices utilized in the attitude adjustment of spacecraft 15, such as one or more reaction wheels or control moment gyroscopes. As one specific example, and as illustrated in FIG. 2, payload 12 may assume the form of a reaction wheel array 20 including a number of reaction wheels 22 mounted to and circumferentially spaced about a support platform 24, which is, in turn, supported by isolators 14 (only three of which can be seen in FIG. 2).

Figure 3:
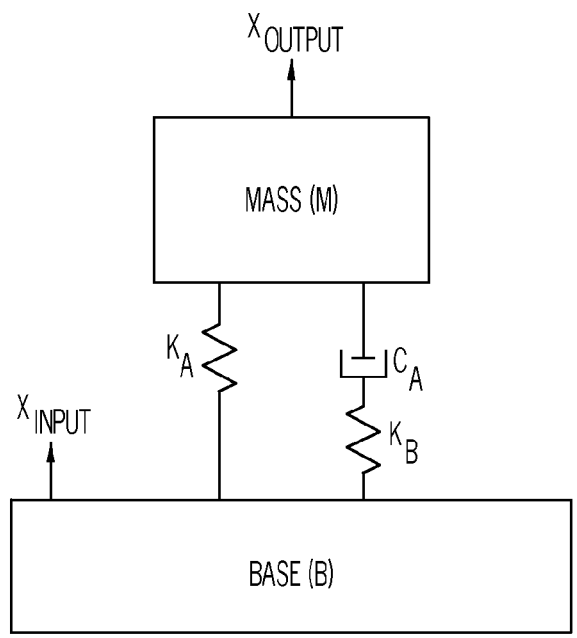
FIG. 3 is a schematic illustrating an exemplary three parameter vibration isolator that may be included within the exemplary isolation system shown in FIGS. 1 and 2.

Vibration isolators 14 are preferably, although not necessarily, three parameter devices. As schematically illustrated in FIG. 3, a three parameter device includes the following mechanical elements: (i) a first spring member $K_A$, which is coupled between a mass M (e.g., payload 12 shown in FIG. 1) and a base B (e.g., satellite mounting interface 16 shown in FIG. 1); (ii) a second spring member $K_B$, which is coupled between damped mass M and base B in parallel with first spring member $K_A$; and (iii) a damper $C_A$, which is coupled between damped mass M and base B in parallel with the first spring member $K_A$ and in series with the second spring member $K_B$. Such a three parameter device provides superior damping characteristics (i.e., a lower overall transmissibility) as compared to undamped device and two parameter devices over a desired operational frequency range. Transmissibility may be expressed by the following equation:

$$T(\omega) = \frac{X_{output}(\omega)}{X_{input}(\omega)} \qquad \text{EQ. 1}$$

wherein $T(\omega)$ is transmissibility, $X_{output}(\omega)$ is the payload output motion, and $X_{input}(\omega)$ is the base input motion.

Figure 4:
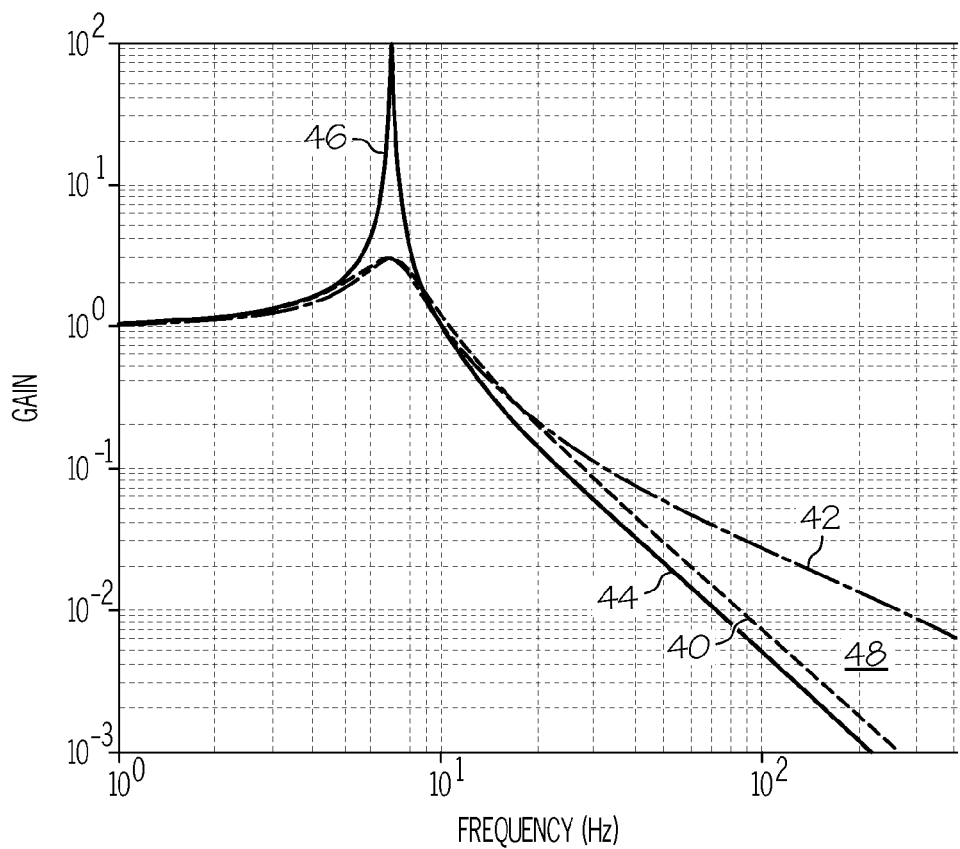
FIG. 4 is a transmissibility plot of frequency (horizontal axis) versus gain (vertical axis) illustrating the exemplary transmissibility profile of a three parameter isolator as compared to the transmissibility profiles of a two parameter isolator and an undamped device.

FIG. 4 is a transmissibility plot illustrating the damping characteristics of three parameter isolator (curve 40) as compared to a two parameter isolator (curve 42) and an undamped device (curve 44). As indicated in FIG. 4 at 46, the undamped device (curve 44) provides an undesirably high peak gain at a threshold frequency, which, in the illustrated example, is moderately less than 10 hertz. By comparison, the two parameter device (curve 42) provides a significantly lower peak gain at the threshold frequency, but an undesirably gradual decrease in gain with increasing frequency after the threshold frequency has been surpassed (referred to as "roll-off"). In the illustrated example, the roll-off of the two parameter device (curve 42) is approximately 20 decibel per decade ("dB/decade"). Lastly, the three parameter device (curve 40) provides a low peak gain substantially equivalent to that achieved by the two parameter device (curve 42) and further provides a relatively steep roll-off of about 40 dB/decade. The three parameter device (curve 40) thus provides a significantly lower transmissibility at higher frequencies, as quantified in FIG. 4 by the area 48 bounded by curves 40 and 42. By way of non-limiting example, further discussion of three parameter isolators can be found in U.S. Pat. No. 5,332,070, entitled "THREE PARAMETER VISCOUS DAMPER AND ISOLATOR," issued Jan. 26, 1994; and U.S. Pat. No. 7,182,188 B2, entitled "ISOLATOR USING EXTERNALLY PRESSURIZED SEALING BELLOWS," issued Feb. 27, 2007; both of which are assigned to assignee of the instant application.

Referring once again to FIG. 1, payload 12 may generate excess heat during operation, especially in embodiments wherein payload 12 assumes the form of a control moment gyroscope array or a reaction wheel array (e.g., reaction wheel array 20 shown in FIG. 2). Vibration isolators, including conventionally-designed three parameter isolators, are typically poor thermal conductors and thus do not provide efficient conduction paths for dissipation of heat from payload 12 to spacecraft 15. Although heat straps can be utilized to provide efficient thermal transfer paths from payload 12 to spacecraft 15, the usage of heat straps adds undesired weight and bulk to spacecraft 15 and may reduce the effectiveness of vibration isolation system 10 by shunting vibratory forces around isolators 14. In accordance with embodiments of the present invention, vibration isolators 14 not only to limit the transmission of vibratory forces between spacecraft payload 12 and spacecraft 15, but also provide highly conductive thermal paths from payload 12 to spacecraft 15. Vibration isolators 14 and, more generally, vibration isolation system 10 thus enables the excess heat generated during operation of payload 12 to be dissipated to the body of spacecraft 15 in a highly efficient manner without the usage of heat straps. In so doing, isolation system 10 prevents the undesired accumulation of heat within payload 12 to maintain the temperature of payload 12 and the surrounding ambient temperature within acceptable thresholds. This enables the operational lifespans of the hardware included within payload 12 to be maximized, while also ensuring optimal attenuation of vibratory forces generated by payload 12.

Figure 5:
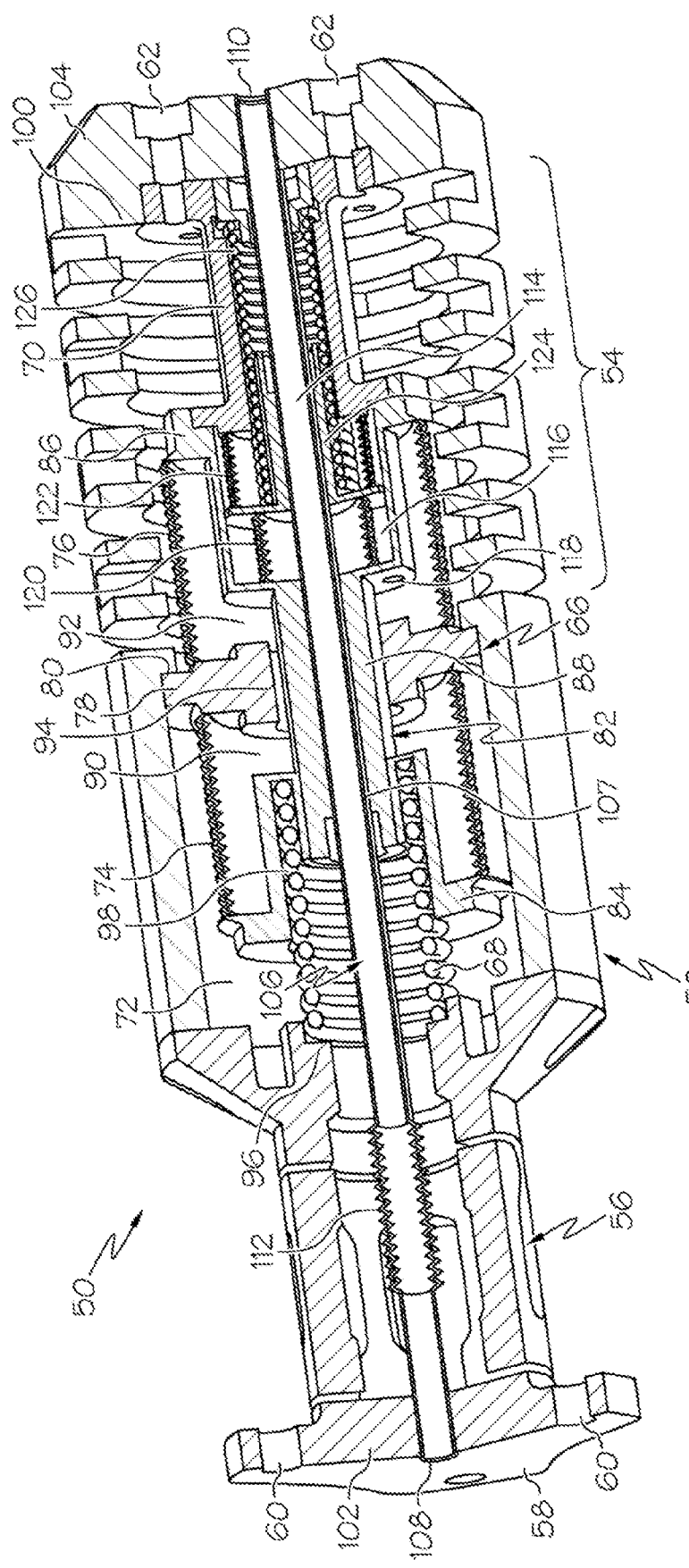
FIG. 5 is a cutaway isometric view of a thermally-conductive vibration isolator illustrated in accordance with an exemplary embodiment of the present invention.

FIG. 5 is an isometric cutaway view of a thermally-conductive vibration isolator 50 illustrated in accordance with an exemplary embodiment and suitable for usage as one or all of isolators 14 shown in FIGS. 1 and 2. Amongst other components, vibration isolator 50 includes a main isolator housing 52, a main spring 54, and a mounting bracket 56. As shown in FIG. 5, main spring 54 may be integrally formed within a section of isolator housing 52 by machining; that is, main spring 54 assumes the form of a section of isolator housing 52 from which material was removed to form a coil spring-like structure. In other embodiments, main spring 54 may be a discrete or independent element (e.g., a coil spring) mechanically coupled to housing 52. In the illustrated example, isolator housing 52 assumes the form of a generally cylindrical body having a unitary or single piece construction; however, isolator housing 52 may assume other geometries and may be assembled from multiple components in alternative embodiments.

Mounting bracket 56 is fixedly attached (e.g., welded or bonded) to an end portion of isolator housing 52 and extends outwardly therefrom in an axial direction. When vibration isolator 50 is installed between a spacecraft and a payload, mounting flange 58 may be mounted the spacecraft payload and the opposing end of isolator housing 52 may be mounted to the spacecraft body. Conversely, mounting flange 58 may be mounted to the spacecraft body and the opposing end of isolator housing 52 may be mounted to the spacecraft payload. As indicated in FIG. 5, mounting bracket 56 can be fabricated to include a mounting flange 58 having a plurality of fastener openings 60 to facilitate attachment to either a spacecraft payload or a spacecraft body utilizing a plurality of bolts or other such fastener (not shown). Similarly, the opposing terminal end of isolator housing 52 may be fabricated to include a plurality of fastener openings 62 therein to facilitate mounting to either the spacecraft body or payload utilizing a plurality of fasteners.

A damper assembly 66 is housed within a generally cylindrical cavity or bore 72 provided in isolator housing 52. In the illustrated example, damper assembly 66 includes a first bellows 74, a second bellows 76, an annular disc member 78, and a damper piston 82. Disc member 78 is sealingly disposed between bellows 74 and 76 and seats on an annular shelf 80 provided around the interior of isolator housing 52. Damper piston 82 includes a first end cap 84; a second, opposing end cap 86; and a connecting shaft 88, which extends from first end cap 84 to second end cap 86. Bellows 74 is sealingly coupled (e.g., welded or bonded) between end cap 84 of damper piston 82 and a first radial face of disc member 78; and bellows 76 is sealingly coupled (e.g., welded or bonded) between end cap 86 of damper piston 82 and a second, opposing radial face of disc member 78. Collectively, bellows 74, bellows 76, disc member 78, and damper piston 82 form a bellows assembly.

Bellows 74, damper piston 82, and disc member 78 cooperate to define a first hydraulic chamber 90 within vibration isolator 50; and bellows 76, damper piston 82, and disc member 78 cooperate to define a second, opposing hydraulic chamber 92 within isolator 50. Opposing hydraulic chambers 90 and 92 are fluidly coupled by way of an annulus 94 defined by an annulus provided between the inner circumferential surface of disc member 78 and an outer circumferential surface of connecting shaft 88 of damper piston 88. Prior to operation of isolator 50, hydraulic chambers 90 and 92 are filled with a damping fluid (not shown), such as a silicone-based liquid. The damping fluid is exchanged between hydraulic chambers 90 and 92 via annulus 94 to provide damping during axial movement of damper piston 92 and corresponding deflection of bellows 74 and 76. In alternative embodiments, hydraulic chambers 90 and 92 may be fluidly coupled by a different type of flow passage or flow passages, such as one or more orifices. Although internally pressurized in the illustrated exemplary embodiment, bellows 74 and 76 are can be externally-pressurized in alternative embodiments of vibration isolator 50.

Thermally-conductive vibration isolator 50 further includes a secondary spring 68 and an axial extension piece 70, which are disposed within bore 72 on opposing ends of damper assembly 66. More specifically, secondary spring 68 is compressed between an inner annular wall 96 of mounting bracket 56 and end cap 84 of damper piston 82. If desired, and as shown in FIG. 5, an annular depression 98 may be formed within the interior of end cap 84 to help retain secondary spring 68 in position. A first end of axial extension 70 abuts end cap 76 of damper piston 92; and the second, opposing end of axial extension 70 abuts an inner wall 100 of isolator housing 52. Secondary spring 68, axial extension piece 70, and damper assembly 66 cooperate with the housing components of vibration isolator 50 (i.e., main isolator housing 52 and mounting bracket 56) to provide a load transfer path through isolator 50, as described more fully below.

First and second load transfer paths are provided through vibration isolator 50 between a first end portion 102 of isolator 50 and a second, opposing end portion 104 of isolator 50. Beginning from first end portion 102 of vibration isolator 50 and moving rightward in the illustrated orientation, the first load transfer path extends through mounting bracket 56, the outer body of isolator housing 52, primary spring 54, and to end portion 104 of isolator 50. The second load path, by comparison, extends through mounting bracket 56, through secondary spring 68, through damper assembly 66, through axial extension 70, and to end portion 104 of isolator 50. The first and second load transfer paths are, of course, bi-directional; vibratory forces may also be transmitted along the first and second load transfer paths in an opposing from end portion 104 to end portion 102 of isolator 50. In keeping with the terminology introduced above in conjunction with FIGS. 3 and 4, $K_A$ is the axial stiffness of isolator 50, as a whole, which is predominately determined by the axial stiffness of primary spring 54; $K_B$ is determined by the volumetric stiffness of isolator 50, which is predominately determined by the axial stiffness of secondary spring 68; and $C_A$ is determined by the damping characteristics of damper assembly 66. Primary spring 54 ($K_A$) is coupled in parallel with secondary spring 68 ($K_B$) and damper assembly 66 ($C_A$), which are coupled in series, as taken along the second load transfer path. Exemplary vibration isolator 50 is thus a three parameter device and provides the desirable vibration attenuation characteristics described above, namely, a relatively low peak transmissibility and excellent attenuation of high frequency vibrations. This example notwithstanding, vibration isolator 50 need not be a three parameter isolator in all embodiments and, in certain embodiments, may instead assume the form of a single degree of freedom, axially-damping, two parameter isolator including a primary spring (e.g., spring 54) in parallel with the damper (e.g., damper assembly 82), but lacking a secondary spring (e.g., spring 68) in parallel with the primary spring and in series with the damper.

Vibration isolator 50 further includes at least one elongated thermal conduit, which extends from first end portion 102 to second end portion 104 of isolator 50. The thermal conduit (or thermal conduits) can assume the form of any body or device having a thermal conductivity exceeding that of vibration isolator 50, as taken along either the first load transfer path or the second load transfer path. For example, in certain embodiments, the thermal conduit may assume the form of an elongated cylinder or wire braid fabricated from a metal or alloy having a relatively high thermal conductivity, such as copper or aluminum. However, in preferred embodiments, the thermal conduit assumes the form of a heat pipe; that is, a hermetically-enclosed pipe or blind tube containing a working fluid (e.g., an ammonia, alcohol, and/or water mixture) that transfers heat from one end of the tube to the other in a highly efficient manner. In most cases, the fluid within the heat pipe undergoes a phase change and, specifically, may absorb latent heat and vaporize at the hot interface of the heat pipe (e.g., a first closed end); the vapor phase then flows to the cool interface of the heat pipe (e.g., an opposing closed end) and condenses thereby releasing latent heat; and the liquid phase then returns to the hot interface to complete the heat transfer circuit. Many heat pipes contain or are internally lined with a wicking material, which promotes flow of the liquid phase from the cold interface to the hot interface via capillary action. Although by no means limited to a particular shape or material, the shell of the heat pipe preferably assumes the form of an elongated, blind tube fabricated from a highly conductive metal or alloy, such as copper or aluminum. Notably, heat pipes are capable of achieving thermal conductivies several times greater than those the thermal conductivies of a solid metal or alloy body (e.g., an elongated copper cylinder) of a comparable size and shape.

With continued reference to the exemplary embodiment shown in FIG. 5, an elongated heat pipe 106 extends along a centerline or longitudinal axis of isolator 50 from first end portion 102, through secondary spring 68, through damper assembly 66, through axial extension 70, and to second end portion 104. Heat pipe 106 is thus substantially co-axial with secondary spring 68, damper assembly 66, and axial extension 70. To accommodate heat pipe 106, axial extension 70 and connecting shaft 88 of damper piston 82 are each formed have a substantially tubular geometry. With respect to damper piston 82, in particular, an axial channel 107 is provided through connecting shaft 88 through which heat pipe 106 extends. The inner diameter of axial channel 107 is preferably substantially equivalent to the outer diameter of heat pipe 106. Heat pipe 106 preferably has a substantially straight profile and extends between end portion 102 and end portion 104 of isolator 50 along a substantially linear path to minimize the overall length of heat pipe 106 and thereby provide relatively short and direct thermal conduction path. In addition, as shown in FIG. 5, the opposing ends of heat pipe 106 may extend through end portion portions 102 and 104 such that heat pipe 106 is exposed through the opposing end surfaces of isolator 50. Stated differently, end portion 102 may be fabricated to include a central opening 108 through which heat pipe 106 extends such that a first terminal end of heat pipe 106 is exposed through, and is preferably substantially co-planar with, the outer terminal surface of end portion 102. Similarly, end portion 104 may be fabricated to include a central opening 110 through which heat pipe 106 extends such that the opposing terminal end of heat pipe 106 is exposed through, and is preferably substantially co-planar with, the outer terminal surface of end portion 104. In such embodiments, the length of heat pipe 106 will be substantially equivalent to the length of isolator 50. In this manner, the opposing ends of heat pipe 106 can be placed in direct or intimate contact with the spacecraft payload and the spacecraft mounting interface to optimize conductive heat transfer when vibration isolator 50 is installed within a vibration isolation system. This notwithstanding, heat pipe 106 need not extend entirely through vibration isolator 50 in all embodiments and may instead terminate prior to breaching the terminal end surfaces of end portion 102 and 104.

Heat pipe 106 is preferably formed to include at least one bellows section 112 to impart pipe 106 with an axial compliance suitable for compressing and expanding in conjunction with primary spring 54, secondary spring 68, and damper assembly 66. As shown in FIG. 5, heat pipe 106 may be fabricated to include a single bellows section 112, which is integrally formed with the elongated body 114 of heat pipe 106 and resides within the longitudinal channel provided through mounting bracket 56. In preferred embodiments, bellows section 112 imparts heat pipe 106 with an axial stiffness less than the axial stiffness of main spring 54 and less than the cumulative axial stiffness of secondary spring 68 and damper assembly 66. Bellows section 112 may impart heat pipe 106 with an axial stiffness that is sufficiently minimal that heat pipe 106 is substantially transparent to vibratory forces transmitted through isolator 50. Alternatively, bellows section 112 may impart heat pipe 106 with an axial stiffness that is significant enough to contribute to overall axial stiffness of damper 50 ($K_A$); however, in such embodiments, the axial stiffness of heat pipe 106 will typically constitute only a fraction (e.g., one tenth) of the axial stiffness of primary spring 54. In still further embodiments, heat pipe 106 may not include a bellows section 112 and may instead include a different type of axially-compliant feature or element, such as a slip joint.

In certain embodiments, vibration isolator 50 may be provided within a thermal expansion chamber 116 fluidly coupled to hydraulic chamber 90 and/or to hydraulic chamber 92 to accommodate expansion of damping fluid under high temperature operating conditions. For example, as shown in FIG. 5, thermal expansion chamber 116 may be fluidly coupled hydraulic chamber 92 via an orifice 118 provided through a wall of piston member 82. In this case, thermal expansion chamber 116 is defined by the inner circumferential surface of piston end cap 86, a third bellows 120, a fourth bellows 122, and a thermal expansion piston 124. Bellows 120 is compressed between piston end cap 86 and a first radial face of thermal expansion piston 124; while opposing bellows 122 is compressed between a second, opposing radial face of thermal expansion piston 124 and axial extension piece 70. Thermal expansion piston 124 is biased toward end portion 102 of isolator 50 by a thermal expansion spring 126. As the temperature of the damping fluid increases, the pressure exerted on the exposed area of thermal expansion piston 124 will increase, as well. When force exerted on thermal expansion piston 124 by the damping fluid exceeds the bias exerted on piston 124 by spring 126, piston 124 will move toward end portion 104, bellows 120 will expand, and bellows 122 will compress. As the outer diameter of bellows 120 is less than the outer diameter of bellows 122, the volume of thermal expansion chamber 116 will increase to accommodate thermal expansion of the damping fluid and thereby help maintain the internal pressure within main hydraulic chambers 90 and 92 with a desired range. Conversely, under low temperature operating conditions, the force exerted on the exposed area of thermal expansion piston 124 by the damping fluid will be less than the bias force exerted on piston 124 by spring 126, piston 124 will slide toward end portion 102, bellows 120 will compress, bellows 122 will expand, and the volume of thermal expansion chamber 116 will decrease to help maintain the pressure within main hydraulic chambers 90 and 92. Notably, bellows 120 and 122 are externally pressurized in the illustrated exemplary embodiment; that is, the exterior surfaces of bellows 120 and 122 partially define thermal expansion chamber 116 and are exposed to the damping fluid when chamber 116 is filled. By externally pressurizing bellows 120 and 122 in this manner, a reliable seal can be formed between thermal expansion chamber 116 and the penetrating segment of heat pipe 106 to minimize the likelihood of damping fluid leakage from vibration isolator 50.

During operation of vibration isolator 50, heat pipe 106 serves as a thermally-conductive core, which extends longitudinally through a central portion of vibration isolator 50 to provide a dedicated, efficient thermal path for the dissipation of heat from a spacecraft payload. In other embodiments, vibration isolator 50 may include one or more heat pipes, which are not centrally disposed, but likewise provide dedicated thermal transfer paths through isolator 50. Due to the manner in which heat pipe 106 is integrated into vibration isolator 50, the overall weight and dimensions of isolator 50 are similar to the weight and dimensions of other known three parameter isolators. A vibration isolation system employing a number (e.g., six to eight) thermally-conductive vibration isolators 50 will consequently be lighter in weight, more compact, and less cumbersome than a comparable vibration isolation system employing conventional vibration isolators in conjunction with heat straps. Furthermore, as heat pipe 106 is designed to have a relatively soft axial stiffness as compared to primary spring 54, secondary spring 68, and damper assembly 66, heat pipe 106 has little to no effect on the vibration attenuation characteristics of thermally-conductive vibratory isolator 50 or on the overall performance of a vibration isolation system employing a number of thermally-conductive vibratory isolators.

In certain embodiments, the thermal conductivity of heat pipe 106 in a first axial direction may exceed the thermal conductivity of heat pipe 106 in a second, opposing axial direction. In such embodiments, it is preferred that thermal conductivity of heat pipe 106, taken in an axial direction from the spacecraft payload to the spacecraft body, exceeds the thermal conductivity of heat pipe 106, taken in the opposing, axial direction from the spacecraft body to the payload. In such embodiments, heat pipe 106 may function more or less as a thermal diode, which deters the undesired heating of the spacecraft payload when the thermal gradient decreases from the spacecraft body to the payload, while promoting removal of heat from the spacecraft payload when the thermal gradient increases from the payload to the spacecraft body.

The foregoing has thus provided embodiments of a thermally-conducive vibration isolator well-suited for both attenuating vibrations between of vibrations, while also providing an efficient thermal path for dissipating heat from a spacecraft payload to a host spacecraft. The foregoing has also provided embodiments of a spacecraft isolation system employing a plurality of thermally-conductive vibration isolators. Relatively to vibration systems utilized in conjunction with heat straps, vibration systems employing embodiments of the above-described thermally-conductive vibration isolators are more compact, lighter weight, and less costly to produce. While, in the above described exemplary embodiment, the elongated thermal conduit assumed the form of a centrally-disposed, generally cylindrical heat pipe, this need not always be the case. For example, other embodiments of the vibration isolator may employ an elongated tubular heat pipe element, which is substantially co-axial with the longitudinal axis of the vibration isolator and within which other components of the vibration isolator are nested; e.g., in such embodiments, the secondary spring (if included), the damping assembly, the thermal expansion chamber (if included), and/or various other components can be nested within the tubular heat pipe.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A thermally-conductive vibration isolator, comprising:
    a first end portion;
    a second end portion substantially opposite the first end portion;
    a first load transfer path from the first end portion to the second end portion and comprising a main spring;
    a second load transfer path from the first end portion to the second end portion, the second load transfer path comprising a damper in parallel with the main spring, wherein the second load transfer path further comprises a secondary spring in parallel with the main spring and in series with the damper; and
    an elongated thermal conduit extending from the first end portion to the second end portion and having a thermal conductivity exceeding that of the first load transfer path and the second load transfer path, wherein the elongated thermal conduit comprises a heat pipe.

2. The thermally conductive vibration isolator according to claim 1 wherein the heat pipe comprises at least one bellows section.

3. The thermally-conductive vibration isolator according to claim 2 wherein the at least one bellow section imparts the heat pipe with an axial stiffness less than the axial stiffness of the main spring and less than the cumulative axial stiffness of the secondary spring and the damper.

4. The thermally conductive vibration isolator according to claim 1 wherein the elongated thermal conduit, the main spring, the damper, and the secondary spring are substantially co-axial.

5. The thermally-conductive vibration isolator according to claim 4 wherein the elongated thermal conduit extends through each of the main spring, the damper, and the secondary spring.

6. The thermally conductive vibration isolator according to claim 1 wherein the heat pipe extends along a centerline of the thermally-conductive vibration isolator.

7. The thermally-conductive vibration isolator according to claim 1 wherein the damper comprises a bellows assembly through which the elongated thermal conduit extends.

8. The thermally-conductive vibration isolator according to claim 7 wherein the bellows assembly comprises:
    first and second bellows;
    a damper piston extending at least partially through the first and second bellows;

first and second hydraulic chambers defined, at least in part, by the damper piston and the first and second bellows, the first and second hydraulic chambers fluidly coupled to provide damping via the flow of hydraulic fluid between the first and second hydraulic chambers in response to axial movement of the damper piston and deflection of the first and second bellows.

9. The thermally-conductive vibration isolator according to claim 8 wherein the damper piston comprises an axial channel through which the elongated thermal conduit extends.

10. The thermally-conductive vibration isolator according to claim 9 wherein an inner diameter of the axial channel is substantially equivalent to an outer diameter of the elongated thermal conduit.

11. The thermally-conductive, three parameter vibration isolator according to claim 8 further comprising:
a thermal expansion chamber fluidly coupled to at least one of the first hydraulic chamber and the second hydraulic chamber; and
a third bellows partially defining the thermal expansion chamber and extending around a section of the elongated thermal conduit.

12. The thermally-conductive vibration isolator according to claim 11 wherein the third bellows is externally pressurize, and wherein thermal expansion chamber is defined, at least in part, by an outer surface of the third bellows and an inner surface of the damper piston.

13. The thermally-conductive vibration isolator according to claim 1 wherein the elongated thermal conduit is exposed through an outer surface of the first end portion and through an outer surface of the second end portion.

14. The thermally-conductive vibration isolator according the thermal conductivity of the heat pipe in a first axial direction exceeds the thermal conductivity of the heat pipe in a second axial direction.

15. A thermally-conductive vibration isolator, comprising:
a first end portion;
a second end portion substantially opposite the first end portion;
a first load transfer path from the first end portion to the second end portion and comprising a main spring;
a second load transfer path from the first end portion to the second end portion, the second load transfer path comprising:
a secondary spring in parallel with the main spring; and
a damper in parallel with the main spring and in series with the secondary spring; and
an elongated heat pipe, comprising:
an elongated body extending from the first end portion to the second end portion through each of the main spring, the secondary spring, and the damper; and
at least one bellows section coupled to the elongated body and imparting the elongated heat pipe with an axial stiffness less than the axial stiffness of the main spring and less than the cumulative axial stiffness of the secondary spring and the damper.

16. The thermally-conductive vibration isolator according to claim 15 wherein the at least one bellows section is integrally formed with the elongated body.

17. An isolation system for minimizing the transmission of vibrations between a spacecraft and a spacecraft payload, the isolation system comprising:
a plurality of thermally-conductive vibration isolators, each comprising:
a first end portion;
a second end portion substantially opposite the first end portion;
a first load transfer path from the first end portion to the second end portion and comprising a main spring;
a second load transfer path from the first end portion to the second end portion, the second load transfer path comprising:
a secondary spring in parallel with the main spring; and
a damper in parallel with the main spring and in series with the secondary spring; and
an elongated heat pipe, comprising:
an elongated body extending from the first end portion to the second end portion through each of the main spring, the secondary spring, and the damper; and
at least one bellows section coupled to the elongated body and imparting the elongated heat pipe with an axial stiffness less than the axial stiffness of the main spring and less than the cumulative axial stiffness of the secondary spring and the damper; and
mounting hardware coupled to plurality of thermally-conductive vibration isolators.

18. The isolation system according to claim 17 wherein the thermal conductivity of the heat pipe taken in a first axial direction from the spacecraft payload to the spacecraft exceeds the thermal conductivity of the heat pipe taken in a second, opposing axial direction from the spacecraft to the spacecraft payload.

* * * * *

UNITED STATES PATENT AND TRADEMARK OFFICE
CERTIFICATE OF CORRECTION

| | |
|---|---|
| PATENT NO. | : 8,899,389 B2 |
| APPLICATION NO. | : 13/111842 |
| DATED | : December 2, 2014 |
| INVENTOR(S) | : Dennis Wayne Smith et al. |

It is certified that error appears in the above-identified patent and that said Letters Patent is hereby corrected as shown below:

In the claims,

Column 11, lines 33 and 34, "according the thermal" should be changed to --according to claim 1 wherein the thermal--.

Signed and Sealed this
First Day of December, 2015

Michelle K. Lee
*Director of the United States Patent and Trademark Office*